3,560,194
FERTILIZER
Ira B. Phillips, Tucson, and Ben E. Adams and William H. Lawhon, Carlsbad, N. Mex., assignors to Duval Corporation, Houston, Tex.
No Drawing. Filed Aug. 24, 1966, Ser. No. 574,806
Int. Cl. C05d 1/02
U.S. Cl. 71—64                  4 Claims

ABSTRACT OF THE DISCLOSURE

This patent discloses the treatment of fertilizer salts with mineral oil to reduce dusting.

---

This invention relates to fertilizers and to a method of treating refined fertilizers to reduce dusting problems.

The production of potassium fertilizer salts results in a certain percentage of very small particles which are undesirable. These particles fly as dust during refining and use of the fertilizers.

It is an object of this invention to provide a potassium salt fertilizer which is substantially free from dust.

It is another object of this invention to provide a method of treating a potassium salt fertilizer to cause the dust particles therein to agglomerate to other dust particles or to the other larger particles in the fertilizer.

Another object is to provide a fertilizer and a method of treating the fertilizer as set forth in the preceding objects in which the reagent used will not detract from or alter the chemical characterisics of the fertilizer.

Another object of this invention is to reduce or eliminate the atmospheric contamination by dust associated with the handling of potassium feritilizer salts at the site of production and at points of treatment and application.

Another object is to reduce or eliminate environmental hazards or discomfort to both animal and plant life which may be caused by dust from potassium fertilizer salts.

Another object is to reduce or eliminate the mechanical damage to and corrosion of equipment used with or associated with potassium fertilizer salts as a result of the dust coming into contact with moving parts of the equipment.

Other objects, features and advantages of this invention will be apparent from the specification and claims.

Inasmuch as there is no known economical process for completely removing all of the dust producing particles, dust control has been attempted by addition of reagents.

Reagents used in the past have been unsatisfactory due to undesirable side effects. Water has been suggested but this produces caking. Petroleum hydrocarbons have been used, but they are injurious to plant life in some concentrations and the hazards of fire and explosion are ever present.

It has been found that dust may be controlled by using vegetable oils. Vegetable oils have no undesirable effects. They not only do not produce caking but they tend to control caking. They are not injurious to plant life and present no hazards. The effect on the solubility rate is minimal. Some of the vegetable oils are quite inexpensive.

It has been found that the vegetable oils having a high percentage of linoleic acid (i.e., in excess of 35%) do an excellent job of controlling dust and are relatively inexpensive. These are cottonseed oil, corn oil, soy bean oil, and safflower oil.

It has been found that cottonseed oil does a superior job, is readily available and as it is relatively inexpensive, cottonseed oil is the preferred vegetable oil for dust control.

The amount of oil used will depend upon the degree of dust control desired.

Preferably sufficient amount of oil is used so that there is no apparent dust in the handling and use of the fertilizer after the application of the oil. It has been found that the addition of .50 gallon of oil per ton of fertilizer will result in a product which is substantially dust free. It will be appreciated that a lesser or greater amount may be used. With a lesser amount the cost of treatment is reduced but more dust is present. It has been found that an acceptable fertilizer can be obtained by treating with 0.35 gallon of oil per ton of product. Of course a greater amount than .50 gallon of oil per ton of product will give even greater dust control but .50 gallon of oil has been found to be sufficient to give a satisfactory product.

It should be stressed that economic considerations are paramount as the cost of fertilizer is relatively low and a suitable reagent must be one which is very inexpensive and it must be one which will give the desired control without any undesirable side effects as noted above and a relatively small amount to again maintain the economics of the treatment within reasonable bounds.

By potassium fertilizer salts, as used herein, is meant potassium sulphate, potassium chloride (muriate of potash) and sulphate of potassium-magnesium (langbeinite). It has been found that vegetable oils are effective on each of these fertilizer.

The effectiveness of the vegetable oil reagents is shown in the following table. Synthetic samples of langbeinite were prepared of coarse as well as dust fractions. The standard samples had the following screen analysis:

| Tyler mesh size: | Cumulative percentage |
|---|---|
| +14 | 18.7 |
| +20 | 44.3 |
| +28 | 67.2 |
| +35 | 77.0 |
| +65 | 86.2 |
| +100 | 90.0 |
| +150 | 92.0 |
| +200 | 94.0 |
| +325 | 96.0 |

Each sample of 454 grams was placed on the porous base plate of the sample container and 9 p.s.i. filtered and dried air was applied to the system for two minutes with the air passing through the porous plate of the sample container. Each 15 seconds of the two-minute period the sample container was vibrated in order to disrupt any air channels which formed in the bed.

The reagent added was equivalent to 0.5 gallon of reagent per ton of material.

It will be noted that this test was designed to give a comparative evaluation of the various reagents with a sample of product which was untreated. The amount of dust displaced in the untreated sample was taken as 100%. The percentages of the treated material displaced are given in percent of the amount displaced from the untreated sample. The test results are as follows:

| Reagent: | Percentage of original dust displaced |
|---|---|
| No treatment | 100.0 |
| Crude petroleum oil | 84.2 |
| Crude castor oil | 68.8 |
| Crude cottonseed oil | 59.7 |
| Crude peanut oil | 55.7 |
| Crude soybean oil | 52.6 |
| Refined corn oil | 45.4 |
| Raw linseed oil | 45.0 |
| Refined safflower oil | 42.1 |
| Refined olive oil | 36.8 |
| Refined cottonseed oil | 36.6 |

In a second group of tests crude cottonseed oil was compared with other oils and surface-active compounds which would be expected to effect cohesion of particles. The test samples, treating amounts and procedure was identical to that given above. The test results were as follows:

| Number | Product | Parts used | Diluent used | Parts used | Percent of original dust displaced |
|---|---|---|---|---|---|
| 1 | Blank | | | | 100 |
| 2 | Crude cottonseed oil | 1 | | | 69 |
| 3 | Tall oil heads | 1 | No. 2 diesel fuel | 1 | 97 |
| 4 | No. 2 diesel fuel | 1 | | | 91 |
| 5 | Getty crude oil | 1 | No. 2 diesel fuel | 2 | 94 |
| 6 | Tallow amine | 1 | do | 2 | 90 |

These tests show that vegetable oils are substantially more effective than all of the other compounds tested. On a cost of additive per ton basis tallow amine, oleate soap and tall head oils have been tested in the plant on langbeinite in comparison with crude and refined cottonseed oil. In comparison with 100% dust control with both crude and refined cottonseed oil the best results obtained with the other products were about 10 percent.

From the above it will be seen that the vegetable oils did a markedly superior job of dust control as compared to all other compounds tested and as further compared to untreated samples.

It will be noted that cottonseed, corn, soybean, and safflower oil, which have relatively high percentages of linoleic acid and are relatively inexpensive oils, did an exceptional job of dust control. Cottonseed oil is the preferred additive in view of its availability and cost.

In plant scale use, cottonseed oil has been applied at 0.5 gallon per ton of product and given satisfactory results. The material is sprayed on the product as it discharges from the storage warehouse. Subsequent movement of the material on conveyors is sufficient to accomplish mixing.

Tests on muriate of potash and sulphate of potash have shown that the vegetable oils are also effective on these fertilizers. In the table below, the samples were identical in composition and size and were treated in the identical manner with the same volume of additive as in the examples given above.

PERCENTAGE OF ORIGINAL DUST DISPLACED

| | Langbeinite, percent | KCl, percent | $K_2SO_4$, percent |
|---|---|---|---|
| Crude cottonseed oil | 59.7 | 26.4 | 47.1 |
| Safflower oil | 42.1 | 21.4 | 33.2 |
| Olive oil | 36.8 | 17.8 | 48.7 |
| No treatment | 100.0 | 100.0 | 100.0 |

The above table shows the percentage of dust displaced from samples as compared with the 100% displaced from the untreated sample and demonstrates that vegetable oils can be used to control dust on langbeinite, muriate of potash, and sulphate of potash.

The foregoing disclosure and description of the invention is illustrative and explanatory thereof and various changes in the process and in the material and amounts thereof may be made within the scope of the appended claims without departing from the spirit of the invention.

What is claimed is:

1. A fertilizer comprising, langbeinite coated with an effective amount of cottonseed oil to reduce dusting problems.

2. A fertilizer according to claim 1 wherein the amount of cottonseed oil is at least .50 gallon of cottonseed oil per ton of langbeinite.

3. A fertilizer comprising, potassium sulphate coated with an effective amount of cottonseed oil to reduce dusting problems.

4. A fertilizer according to claim 3 wherein the amount of cottonseed oil is at least .50 gallon of cottonseed oil per ton of potassium sulphate.

References Cited

UNITED STATES PATENTS

| 3,321,298 | 5/1967 | Bidlack et al. | 117—100 |
| 3,393,973 | 7/1968 | Almy | 23—89 |
| 2,155,499 | 4/1939 | Lawson | 71—64(E)UX |
| 3,063,800 | 11/1962 | Dancy | 23—89 |

J. L. DECESARE, Primary Examiner